United States Patent Office 3,440,361

Patented Apr. 22, 1969

3,440,361

SELECTIVE FREQUENCY BAND COMPRESSION FOR MODULATED GROOVE SOUND RECORDING

Michael Batchelor, St. Peter, and Donald William Harley Paine, London, England, assignors to Electric & Musical Industries Limited, Hayes, England, a company of Great Britain Filed Jan. 25, 1965, Ser. No. 427,851

Claims priority, application Great Britain, Jan. 29, 1964, 3,729/64; Oct. 10, 1964, 41,437/64

Int. Cl. G11b *3/00*

U.S. Cl. 179—100.4 6 Claims

ABSTRACT OF THE DISCLOSURE

This specification describes circuit arrangements for effecting compression of a sound signal for modulated groove disc recording in which the signal is divided into a number of frequency bands and the amplitude of the signal in the different frequency bands is separately controlled by variable gain amplifiers in response to the excess over threshold values of the groove modulation slope and curvature corresponding to the signal components in the respective frequency bands. The bandwidth of the signal components from which each control signal is derived may be the same as or greater than that of the signal controlled.

The present invention relates to methods and apparatus for modulated groove sound recording. Limiters are often used to provide protection in recording systems to allow the average percentage modulation to be raised.

A conventional programme limiter or compressor is essentially a network having a flat frequency response and a gain or loss controlled so that the output does not exceed some particular value, independent of signal frequency. If, however, the protected system overloads at different levels for different frequencies then conventional limiters or compressors cannot provide correct protection at all frequencies. Suitable pre- and post-equilisation around a conventional limiter or compressor will allow correct protection at all frequencies, but may degrade significantly the signal to noise ratio of the system if the equalisation is extensive. Moreover, at any instant the programme signal distribution is usually such that overload occurs in a narrow band of frequencies and a conventional limiter or compressor reduces the level over the whole frequency band whilst limiting.

An object of the invention is to provide an improved limiter in which the above difficulties are at least partially overcome thereby to provide improved recording.

According to a first aspect of the present invention there is provided apparatus for processing a signal representing sound for application to a cutter to produce a modulated groove sound record comprising an input circuit, an output circuit connected to said cutter, and a plurality of channels each of variable gain connected respectively to pass different bands of frequency from said input circuit to said output circuit, each channel including means dependent on the signal components in the respective channel for effecting gain of that channel to produce signal compression, the means for effecting gain control in one at least of said channels being such that the gain of said one channel is dependent on at least one of the velocity and acceleration of said cutter corresponding to the signal components in the said one channel.

According to a second aspect of the present invention there is provided a method of producing a modulated groove record by means of a recording cutter wherein groove modulation slope and curvature are limited by the compression of components of a signal used to effect the recording in one or more frequency bands in dependence upon at least one of the velocity and acceleration of said cutter corresponding to the respective components.

Figure 1:
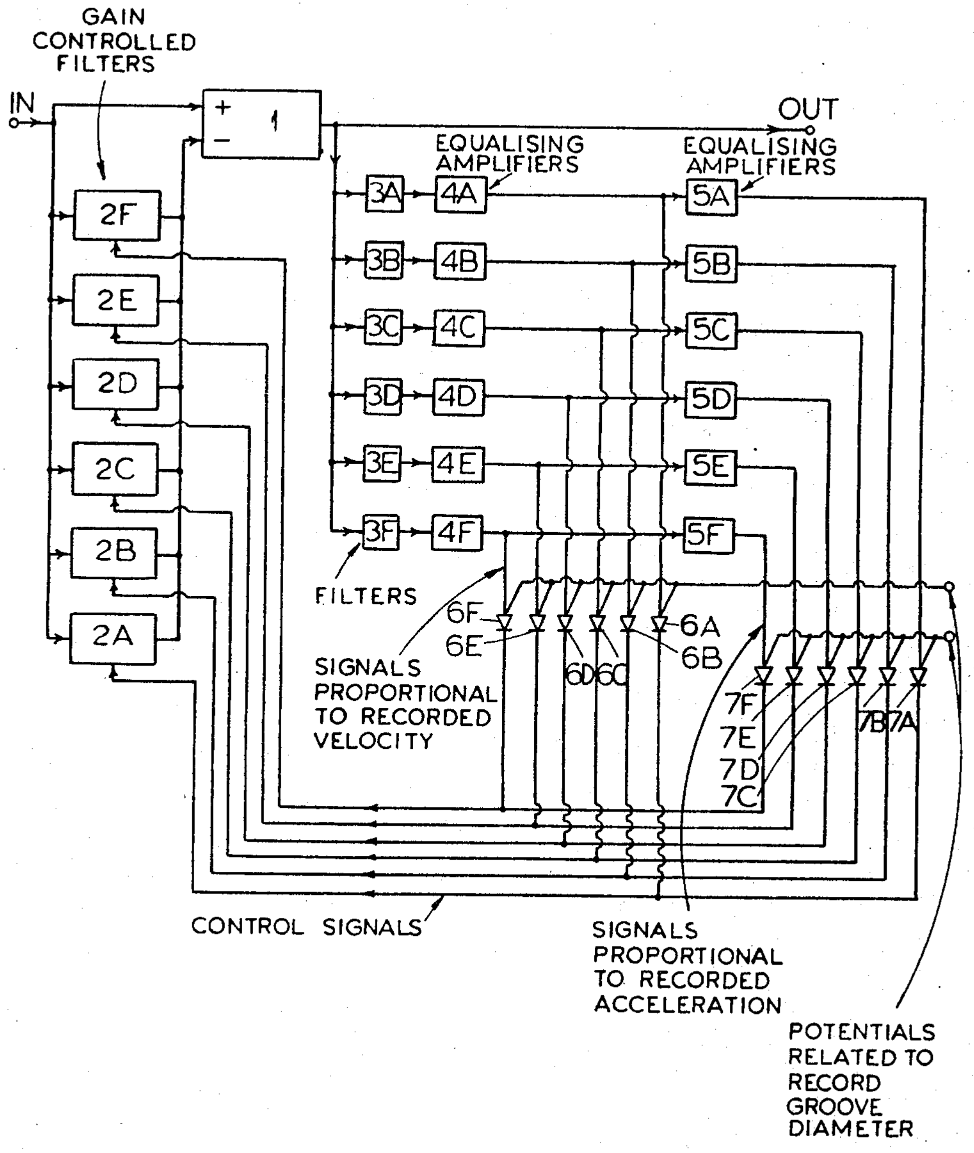
Figure 2:
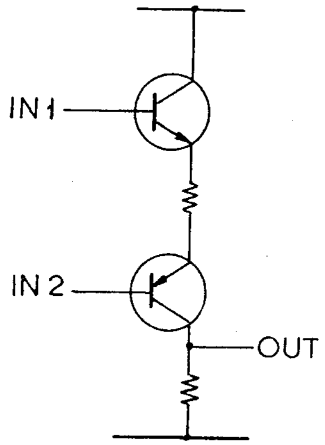
Figure 3:
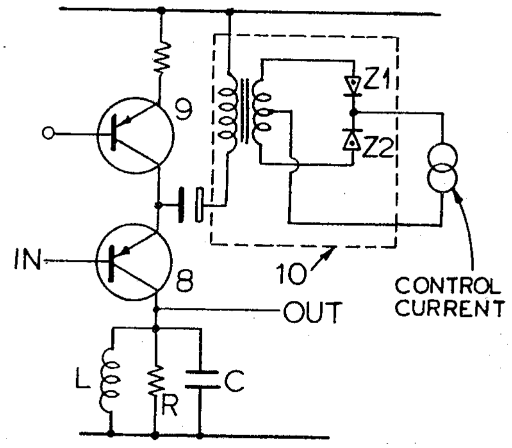
Figure 5:
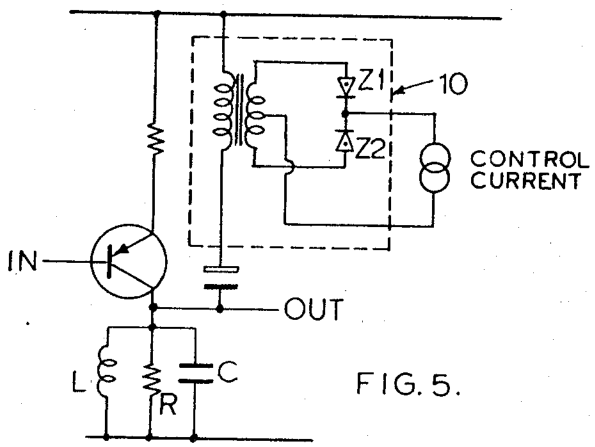
Figure 4:
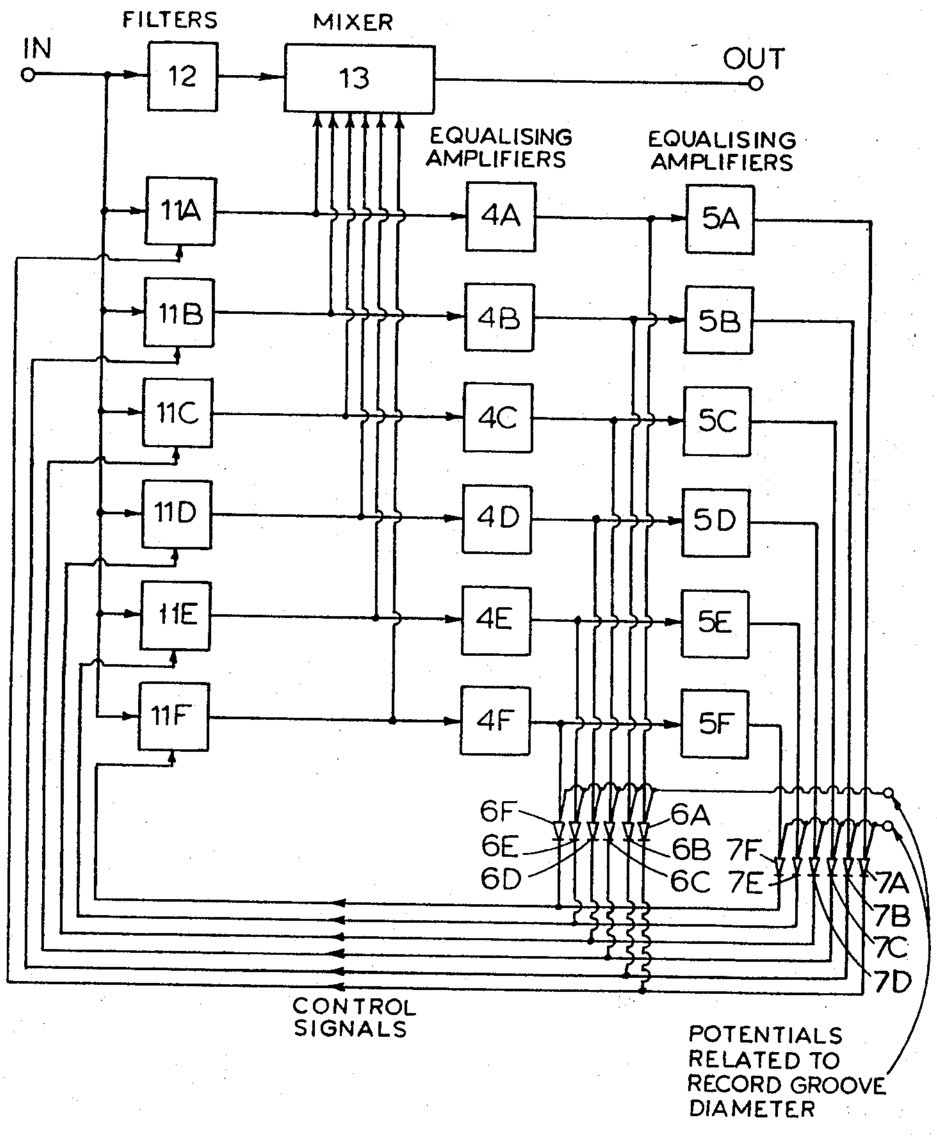
Figure 6:
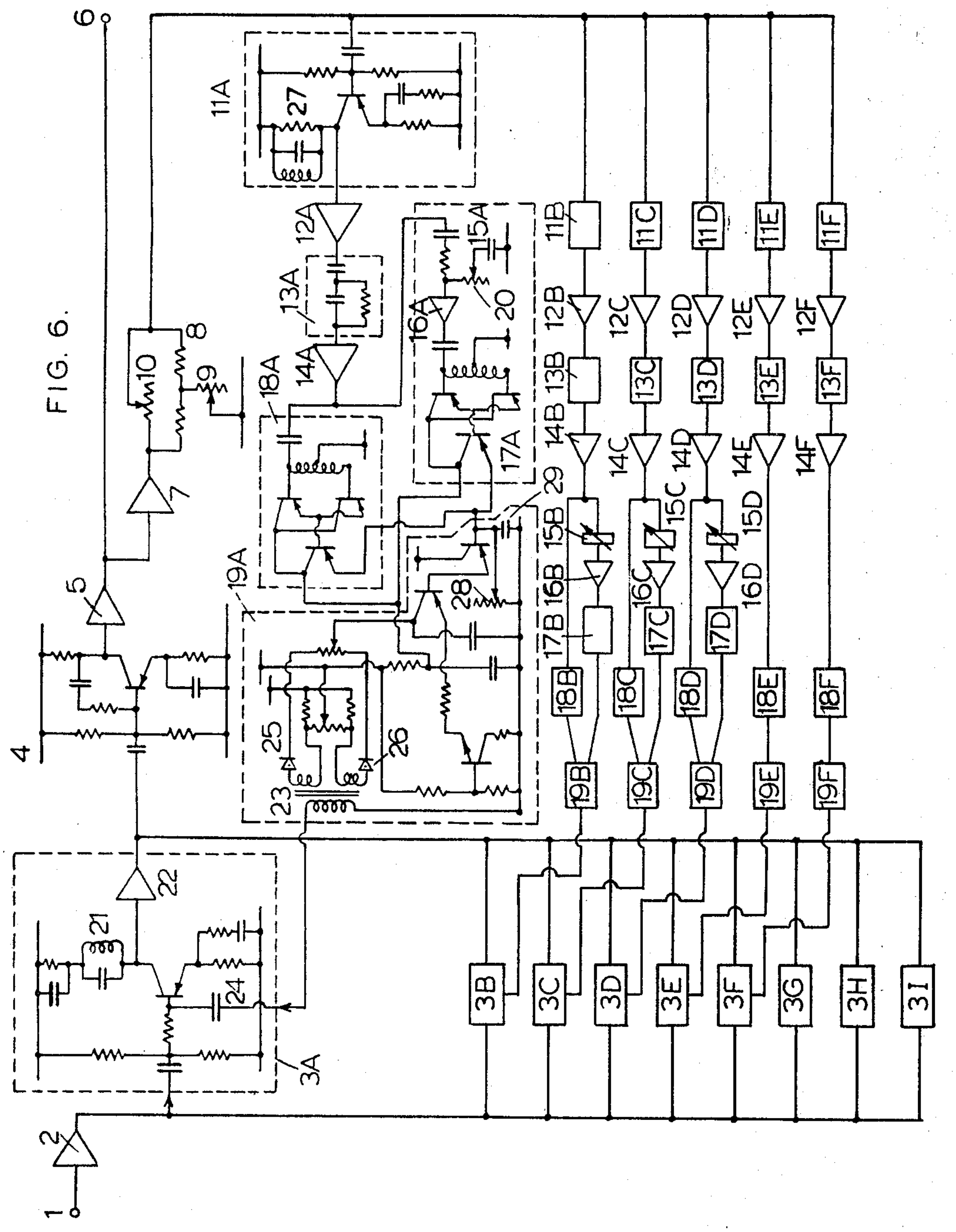

In order that the invention may be fully understood and readily carried into effect it will now be described with reference to the accompanying drawings of which:

FIGURE 1 is a diagram mainly in block form of one example of a limiter according to the invention, FIGURE 2 is a circuit diagram of a preferred construction of a component of FIGURE 1, FIGURE 3 is a circuit diagram of the preferred construction of another component of FIGURE 1, FIGURE 4 is a diagram mainly in block form of a second example of the invention, and FIGURE 5 is a diagram of a preferred construction of a component of FIGURE 4, and FIGURE 6 shows the form of limiter illustrated in FIGURE 4 modified in accordance with a further example of the invention by which a greater degree of limiting can be achieved.

In one example of the invention the transmission channel through which the signal is passed includes a network having a flat frequency response for all signal levels below a threshold value, but when the signal level exceeds this value at one or more frequencies then one or more narrow troughs including the frequencies for which the signal level is excessive are developed in the response of the network. The depths of the troughs are sufficient to ensure that the output signal from the network has a level at any frequency which does not exceed the threshold value for that frequency.

One way in which a trough may be formed in the frequency response of a network is to pass a fraction of the input to the network through a narrow band-pass filter and subtract this fraction from the input signal, the depth of the trough being determined by the fraction subtracted. The fraction may be controlled by a signal produced by comparison in a control channel of a potential derived by rectification of the output of a further band-pass filter similar to the first filter, connected to the output of the network, with a threshold potential.

Alternatively the signal subtracted may be a fraction of the output of the further band-pass filter instead of being a fraction of the input signal passed through a separate filter. In this arrangement the number of filters required is halved, but the range of control necessary is increased, because the output of the network and hence the control signal output are reduced relatively to the input signal by an amount equal to the depth of the trough.

A third method of producing a trough is to use a network comprising a number of band-pass filters connected in parallel, each having controllable gain, and having consecutive pass-bands so that the overall frequency response for the frequency range covered by the filters is flat in the absence of a control signal. The gain of one or more of the filters is reduced by control signals to introduce the trough or troughs into the frequency response.

A number of control channels having band-pass filters with consecutive frequency bands may be used to protect from overload as much of the frequency spectrum of the programme as may be desired. The control channels may include equalisers so that the threshold level is varied with frequency to conform with the overload characteristic of the system to be protected.

The embodiments of the invention shown in the drawings and described with reference thereto are intended to prevent overload in a disc recording system. Overload in a disc recording system may be defined as a groove modulation slope greater than a predetermined angle such as 45° or a groove modulation curvature measured at the point of contact greater than that of a replay stylus having a predetermined tip radius. Since the velocity of the groove relative to the cutter and replay styli in a circumferential direction, is greater towards the outer edge of the record than towards the centre, it is clearly necessary to adjust the threshold levels in dependence upon the radial distance of the groove from the centre of the record.

Referring now to FIGURE 1, the programme material to be recorded on a gramophone record disc is applied to the terminal IN, which terminal is connected to one input of a network 1 and to the inputs of six separate gain controlled band-pass filters 2A, 2B, 2C, 2D, 2E and 2F. The outputs of the filters 2 are connected to another input of the network 1 which includes a subtracting circuit so that any signal transmitted through the filters 2 is subtracted from that applied directly from the terminal IN to the circuit 1. The six gain controlled filters 2 have centre frequencies of 500 c./s., 1 kc./s., 2 kc./s., 4 kc./s., 8 kc./s., and 16 kc./s. The filters 2 are arranged to introduce considerable attenuation in the absence of a control signal so that their output has negligible effect on the signal applied directly to the circuit 1 from the terminal IN. As the control signal rises, so the attenuation of the filters 2 is reduced.

The output of the circuit 1 is connected directly to the terminal OUT for application to the recording head amplifier. A fraction of the output of the circuit 1 is passed through six band-pass filters 3A, 3B, 3C, 3D, 3E and 3F, having the same centre frequencies as those of the filters 2A, 2B, 2C, 2D, 2E and 2F, but frequency responses such that the response at frequencies midway between adjacent centre frequencies is not more than say 1 db below that at the centre frequencies and then through six identical equalising amplifiers 4A, 4B, 4C, 4D, 4E and 4F having frequency responses equal to the recording characteristic and finally through six identical equalising amplifiers 5A, 5B, 5C, 5D, 5E and 5F having frequency responses rising at 6 db per octave. Individual rectifiers 6A, 6B, 6C, 6D, 6E and 6F are connected to the outputs of amplifiers 4, and individual rectifiers 7A, 7B, 7C, 7D, 7E and 7F are connected to the outputs of amplifiers 5. It will be appreciated by those skilled in the art that the signals applied to the rectifiers 6 and 7 from amplifiers 4 and 5 are proportional to the recorded velocity and acceleration respectively.

Two different direct potentials, both functions of the record groove diameter are derived from variable resistors mounted on the recording lathe and driven by the carriage of the lathe. The first of these potentials is added to the signals applied to the rectifiers 6 and the second of these potentials is added to the signals applied to the rectifiers 7, the functions being chosen so that the combined signals fed to the rectifiers 6 and 7 are approximately proportional to groove modulation slope and curvature respectively. All of the rectifiers 6 and 7 are reverse biased by a constant third potential, larger than either potential derived from the resistors on the lathe carriage. By suitable choice of gain in the equalising amplifiers 4 and 5 taking account of the sensitivity of the recording head amplifier, it is arranged that one or more of the rectifiers 6 or 7 will conduct when either the signals proportional to the groove modulation slope or those proportional to the groove modulation curvature have approached the values corresponding to overload of the record, taking into account both frequency and groove diameter. Control signals proportional to the rectifier outputs are fed to the appropriate gain controlled filters 2 so as to produce one or more troughs in the frequency response of the network at frequencies approximating to those causing overload, and of just sufficient depth to prevent overload.

An alternative method of controlling the rectifier thresholds in accordance with the record groove diameter is to control the gain of the equalising amplifiers 4 and 5. The first and second direct potentials applied to the rectifiers 6 and 7 would then be fixed.

Of course, the frequency responses of the filters 2 and 3 may be chosen in other ways to suit the programme material or the system in which the limiter is incorporated. Preferably the control signal circuit has a short time constant for rises in the control signal, say about 1 millisecond, and a much longer time constant, about ½ second, for discharging the control signal.

Although the subtracting circuit in the network 1 may consist of a long tailed pair of transistors using the collector impedance of a third transistor as the tail so as to provide adequate coupling between the pair of transistors, preferably the circuit arrangement shown in FIGURE 2 is used in which an NPN and PNP transistor are connected in series, the emitters of the transistors being connected by a resistance and the output signal obtained from the collector of one or other transistor by means of a suitable load resistance. The operation of the circuit arrangement is similar to that of the long tailed pair in that the output signal depends on the difference between the input signals applied to the bases of the two transistors.

FIGURE 3 shows one example of a gain controlled filter suitable for use as the components 2 of FIGURE 1. The filter comprises a transistor amplifier 8 having a damped resonant circuit LCR as the collector load across which the output signal is developed. The transistor 8 has an emitter impedance in the form of the emitter collector path of a transistor 9 connected in parallel with the primary of a transformer included in the network 10. The rest of the network 10 consists of the centre tapped secondary winding of the transformer across which are connected Zener diodes Z1 and Z2 connected in series as indicated. The gain controlling current is applied between the centre tap of the secondary winding of the transformer and the common connection of the Zener diodes. A steady bias voltage is applied to the base of the transistor 9 so that it appears as a very high impedance to the emitter lead of the transistor 8.

Because of the high impedance in the emitter lead of the transistor 8 provided by the transistor 9 and because the impedance of the network 10 is also high when no control current flows, a large amount of negative feedback is applied to the transistor 8 so that its gain is very low. As the control current is increased the impedances of the Zener diodes are reduced so that the network 10 is made to appear as a lower impedance in parallel with the transistor 9 thus reducing the negative feedback and increasing the gain of the transistor 8.

FIGURE 4 shows a second example of a limiter according to the invention in which the functions of the filters 2 and 3 are combined together and performed by the filters 11. In this example instead of increasing the proportion of signals passed through the filters 2 and subtracting these proportions from the input signal as in FIGURE 1, the signals which are passed through the filters 11 are combined to form the output signal. It is important in this example that the combined frequency response of the filters 11 in the absence of a control signal together with the response of the filter 12 should be flat over the frequency range required for the recording. The centre frequencies of the filters 11 may be, for example, 500 c./s., 1 kc./s., 2 kc./s., 4 kc./s., 8 kc./s. and 16 kc./s, the shapes of the frequency response curves being chosen so that the overall frequency response is flat. The signal is also applied to the low pass filter 12 of fixed gain which combines with the filters 11 to provide the overall flat response. The outputs of the filters 11 and the filter 12 are combined together in the mixer 13 to provide the output signal for the recording head amplifier. The operation of the arrangement of FIGURE 4 is similat to that of FIGURE 1 except that the gain of the filters 11 is reduced by the control signals instead of being increased as in FIGURE 1. Additional filters may be included in the inputs of the amplifiers 4 to adjust the signal levels at frequencies in the regions of the mid-points between the centre frequencies of the filters 11, so as to correct for the greater attenuation of signal components in any one frequency band having frequencies near the mid-point, which is caused by the filter 11 for that band.

FIGURE 5 shows a circuit diagram of a gain controlled filter suitable for use as the components 11 of FIGURE 4. This filter is similar to that of FIGURE 3 but differs from it in that the network 10 is connected from the collector of the transistor to the supply rail so that variation of the impedance of the Zener diodes Z1 and Z2 in response to the control current has the opposite effect on the output signal of the filter to that in FIGURE 3. Therefore increase in conduction of the diodes Z1 and Z2 in FIGURE 5 causes an increase in attenuation of the output signal as a result of the reduction of the shunting impedance.

In the arrangement described above with reference to FIGURE 4 the programme is transmitted through a plurality of filters in parallel and the gains of the filters are selectively controlled in response to the signal levels in respective pass bands. In such an arrangement however owing to the overlap of the skirts of the response of filters defining adjacent pass band it is not possible to reduce the signal level in one pass band by more than a relatively small amount, typically 5 to 6 db. FIGURE 6 shows the form of limiter illustrated in FIGURE 4 modified in accordance with a further example of the invention by which a greater degree of limiting can be achieved.

In FIGURE 6, the input terminal 1 is connected via emitter follower amplifier 2 to nine filters 3A, 3B . . . 3I of which filters 3A, 3B . . . 3F are arranged to have controllable gain and filters 3G, 3H and 3I have fixed gain. The outputs of filters 3A, 3B . . . 3I are all applied to the input of the combining amplifier 4, which, in the example shown, is a transistor amplifier having negative feedback so as to operate as a virtual earth amplifier. The output of the amplifier 4 is amplified by a so called "ring of three" direct coupled transistor amplifier 5 from which an output signal is transmitted via the output terminal 6.

Since the limiter illustrated in the figure is particularly adapted for use in controlling the programme for a gramaphone record disc the output from the terminal 6 would be connected via a gain control and recording amplifier to a recording cutter. Moreover, the criteria on which the limiting is based are to restrict the maximum recorded slope to 45° and the maximum curvature of the modulated groove or rather its minimum radius of curvature to be greater than the predetermined radius of the replay stylus.

The output of the amplifier 5 is also connected via emitter follower amplifier 7 to a bridged-T attenuator 8 having two adjustable resistances 9 and 10. The signal from the attenuator 8 is applied in parallel to the six control channels A, B, C, D, E and F associated with the filters 3A, 3B, 3C, 3D, 3E and 3F respectively. The first four of these control channels are substantially identical except for variations in the filter pass band frequencies and other slight variations necessary as a result of the differing frequencies to be handled. The other two of these control channels differ from the first four in that the circuitry producing signals proportional to recorded acceleration is omitted.

Considering the control channel A associated with the filter 3A, the signal from the attenuator 8 is applied via filter 11A and emitter follower amplifier 12A to an equalising network 13A. From 13A the signal is amplified by a so-called "ring of three" transistor direct coupled amplifier 14A and the amplified output signal is applied to a rectifier 18A and also via a differentiating circuit to an attenuator 15A, and a further "ring of three" transistor direct coupled amplifier 16A to another rectifier 17A. The rectified signals from rectifiers 17A and 18A are applied in parallel to a control circuit 19A which responds to the greater of the output signals from rectifiers 17A and 18A to determine the impedance appearing at the secondary winding of a transformer 23 connected in series with a condenser 24 across the base-emitter path of the transistor amplifier included in the filter 3A.

The control channels B, C and D for filters 3B, 3C, and 3D are substantially identical to that for filter 3A which is shown in detail in the drawing. The control channels for filters 3E and 3F are similar but lack the attenuator 15, the amplifier 16 and the second rectifier 17 of the channels A, B, C and D.

The filters 3A, 3B . . . 3I have centre frequencies of 16 kc./s., 8 kc./s., 4 kc./s., 2 kc./s., 1 kc./s., 500 c./s., 250 c./s., 120 c./s., 51 c./s. respectively. The selectivity of the tuned circuits such as 21 included in the filters 3 is chosen to be as high as is consistent with a reasonably flat overall response in the quiescent state, that is to say the state in which all of the associated transistor amplifiers have their maximum gain. This choice of selectivity minimises the degree of control required to produce a trough of any given depth in the response. The control channels A, B, C, D, E and F operate in the same way as those described above except that instead of varying the threshold potentials at which limiting takes place in response to potentials related to the record groove diameter derived from the recording lathe, the gains of the control channels are varied by means of the attenuator 8 and the attenuators 15A, 15B, 15C and 15D by the adjustment of the variable resistances 9 and 10 of the attenuator 8 and the variable resistances such as 20 in 15A, 15B, 15C, 15D by means of a servo mechanism coupled to the lathe, or alternatively by manual operation.

The tuned circuits such as 27 included in the filters 11A, 11B . . . 11F are flatly tuned, so that the response of each filter is about 1 db down at half of and twice the centre frequency of the filter. This means that in the event of an excessively high signal level at, for example, the centre frequency of filter 11B, 8 kc./s., the control channel B will reduce the gain of the filter 3B as far as necessary to reduce the signal level at 8 kc./s. appearing at the output of the amplifier 5 to the threshold level. If this is not sufficient a rise of only 1 db in the output level of the amplifier 5 will cause the control channels A and C to react and to reduce the gains of the filters 3A and 3C respectively thereby to deepen the trough in the overall response of the limiter. In this way the limiter is able to handle input signals having an amplitude greater than 16 db above threshold level.

The equalisers 13 connected in the input of the amplifiers 14 have a frequency response equal to the recording characteristic, so that because of the effect of the attenuator 8 the output signals of the amplifiers 14 are proportional to the recorded slope. The amplifiers 16, by virtue of the differentiating circuits connected in their input circuits and the attenuators 15, produce output signals proportional to the curvature of the recorded modulation. The output signals of amplifiers 14 and 16 are rectified by similar rectifying circuits 18 and 17 respectively. These rectifying circuits are arranged to charge condensers such as 29 in the control circuits 19 very rapidly so as to provide a rapid reduction in the gain of the corresponding one of the filters 3. The variable resistors 28 are used to adjust the discharging time constant of the condensers 29 so that the rate of rise in gain following a passage which has been limited may be adjusted to produce the most acceptable result. The voltages on the condensers 29 are thus proportional to recorded slope or curvature whichever is the greater for the components in the respective pass bands of filters 11. When these voltages reach about 4 volts the three transistors included in the respective control circuits 19 which are normally non-conducting become conducting and draw current through the respective pair of Zener diodes such as 25 and 26. The Zener diodes 25 and 26 have a logarithmic characteristic such that their impedance varies as the inverse of the current drawn through them. Considering the channel A, the impedance of a pair of Zener diodes appears across the secondary winding of the transformer 23 which is connected across the emitter-base path of the transistor amplifier included in the filter 3A so that the gain of this transistor amplifier is reduced with an incraese in voltage on the condenser 29.

The components producing a signal proportional to the recorded curvature 15, 16 and 17 are omitted from the control channels E and F because at the frequencies covered by these channels excessive groove curvature only occurs after the recorded slope has become excessive and therefore it is only necessary to limit the signals in channels E and F in response to signals proportional to recorded slope.

As curvature overload always occurs before slope overload in the highest frequency channel, the slope signal rectifier 18 may be omitted in this channel. Owing to the fact that large signals in one channel affect the adjacent channels it is necessary to provide means for producing control in response to both slope and curvature overload in certain channels where a signal in that channel would always produce an overload of one type first.

All the amplifiers included in the arrangement described have flat frequency responses in their working ranges.

In the arrangement just described the sides of the troughs produced in the overall response of the limiter are not excessively steep so that ringing which might otherwise be produced is avoided. This however means that components of frequency not tending to produce overloading will be limited as well as those that do.

It will be appreciated that by means of the examples of the invention described above, slope and curvature overload due to signal components in any one frequency band are prevented, but it is possible that overload will still occur as a result of the simultaneous occurrence of signal components producing high slope or curvature loadings in two frequency bands. This possibility can be reduced or even overcome by producing signals representing the slope and curvature of the entire signal which, on exceeding the threshold levels, are applied via gates controlled by functions, such as the slopes and curvatures, of the signal components in the different frequency bands to control the gains in the respective channels. The gates may, for example, be such that only that or those gates for which the controlling function has a value greater than those of the controlling functions of the other gates is open to pass signals to control the gain of the respective channel or channels, so that only signal components contributing greatly to the slope and curvature loadings are reduced in amplitude. These last arrangements can be used as an addition or an alternative to the previously described examples of the invention.

For frequencies below 500 c./s. the levels of signal necessary to produce slope or curvature overload of the recording are higher than those that would cause too great a lateral displacement of the groove. In the examples described, therefore, no protection is provided for these low frequency signals. However, in other systems limiting may be required to be carried out according to different criteria than those specified above, in which case limiting of signals below 500 c./s. may be desirable and may be provided by means of suitable filters in the arrangement described above.

Whilst the invention has been described with reference to specific embodiments it is by no means limited to these embodiments and many other arrangements embodying the invention will be evident to those skilled in the art. For example, the signal which is produced from the audio signal to drive an electromagnetic recording cutter, may be applied as input signal to compression apparatus according to the invention instead of the audio signal itself; in which case the signal proportional to the velocity of the cutter is derived directly from the amplitude of the input signal and the signal proportional to the acceleration is derived from the first derivative of the input signal, the output signal of the apparatus being applied to the cutter.

What we claim is:

1. Apparatus for processing a signal related to sound before utilising the signal to control a cutter to produce a modulated groove disc record comprising an input circuit for the signal, an output circuit for an output signal, a plurality of variable gain circuits, each including a filter effective to pass a different band of frequencies from the filters of other variable gain circuits, connected in parallel paths from said input circuit to said output circuit, means connected to said output circuit arranged to produce signals dependent on the slope of the groove modulation corresponding to components of said output signal in said different frequency bands, and a plurality of control means each connected from said means for producing slope signals to a gain control connection of the respective variable gain circuit to apply a signal to said gain control connection in response to the excess of the corresponding slope signal over a respective threshold level, thereby to effect compression of said input signal independently in said different frequency bands.

2. Apparatus for processing a signal related to sound before utilising the signal to control a cutter to produce a modulated groove disc record comprising an input circuit, an output circuit, a plurality of channels including respective variable gain circuits and respective filters passing different bands of frequencies from said input circuit to said output circuit, separate control means for the channels dependent on the signal components in the respective channels to control the gains of the respective variable gain circuits of the channels to produce signal compression, the control means for at least one of said channels comprising means for producing a signal dependent on the excess over a threshold value of the slope of the groove modulation corresponding to the signal components in said one channel, and the control means in at least another of said channels comprising means for producing signals dependent on the excesses over threshold values of the slope and curvature of the groove modulation corresponding to the signal components in said other channel.

3. Apparatus for processing a signal related to sound before utilising the signal to control a cutter to produce a modulated groove disc record comprising an input circuit for receiving the signal related to sound, an output circuit, and a control circuit connected from said input circuit to said output circuit, and wherein the improvement consists in said control circuit comprising, a plurality of channels including filters for selecting components of said signal in different frequency bands, a plurality of variable gain circuits for controlling the gains from the input to the output circuit in pass bands related respectively to said different frequency bands, means in the channels for utilising the signal components selected by the respective filters to derive control signals, each of which is a function of one at least of the slope and curvature of the groove modulation corresponding to the selected signal components in the respective channel, and means for applying the control signals to the respective variable gain circuits to control the gains within the respective pass band so as to produce compression of the signal related to sound in the output circuit.

4. Apparatus according to claim 3 comprising means for applying said input signal to said output circuit and for subtracting the output signals from said variable gain circuits from said input signal to produce said output signal.

5. Apparatus according to claim 3 comprising means for additively applying the output signals from said variable gain circuits to said output circuit to produce said output signal.

6. Apparatus according to claim 3 comprising individual means for each channel producing signals dependent on one of the slope and curvature of the groove modulation corresponding to the signal components in the channel but said individual means being responsive to signal components in a band of frequencies wider than and including the band of frequencies of the channel.

References Cited

UNITED STATES PATENTS

| | | | |
|---|---|---|---|
| 3,013,125 | 12/1961 | Goldmark et al. | 179—100.4 |
| 2,122,207 | 6/1938 | Kellogg | 179—100.4 |
| 2,284,744 | 6/1942 | Kellogg | 179—100.4 |
| 2,343,471 | 3/1944 | Nixon | 333—14 X |
| 2,791,640 | 5/1957 | Wolfe | 179—100.2 |
| 3,075,052 | 1/1963 | Terry | 179—100.4 |
| 3,111,635 | 11/1963 | Skov et al. | 333—14 |
| 3,223,789 | 12/1965 | Ooms | 179—100.4 |
| 3,292,116 | 12/1966 | Walker et al. | 333—18 |

TERRELL W. FEARS, *Primary Examiner.*

RAYMOND F. CARDILLO, Jr., *Assistant Examiner.*